2,905,816

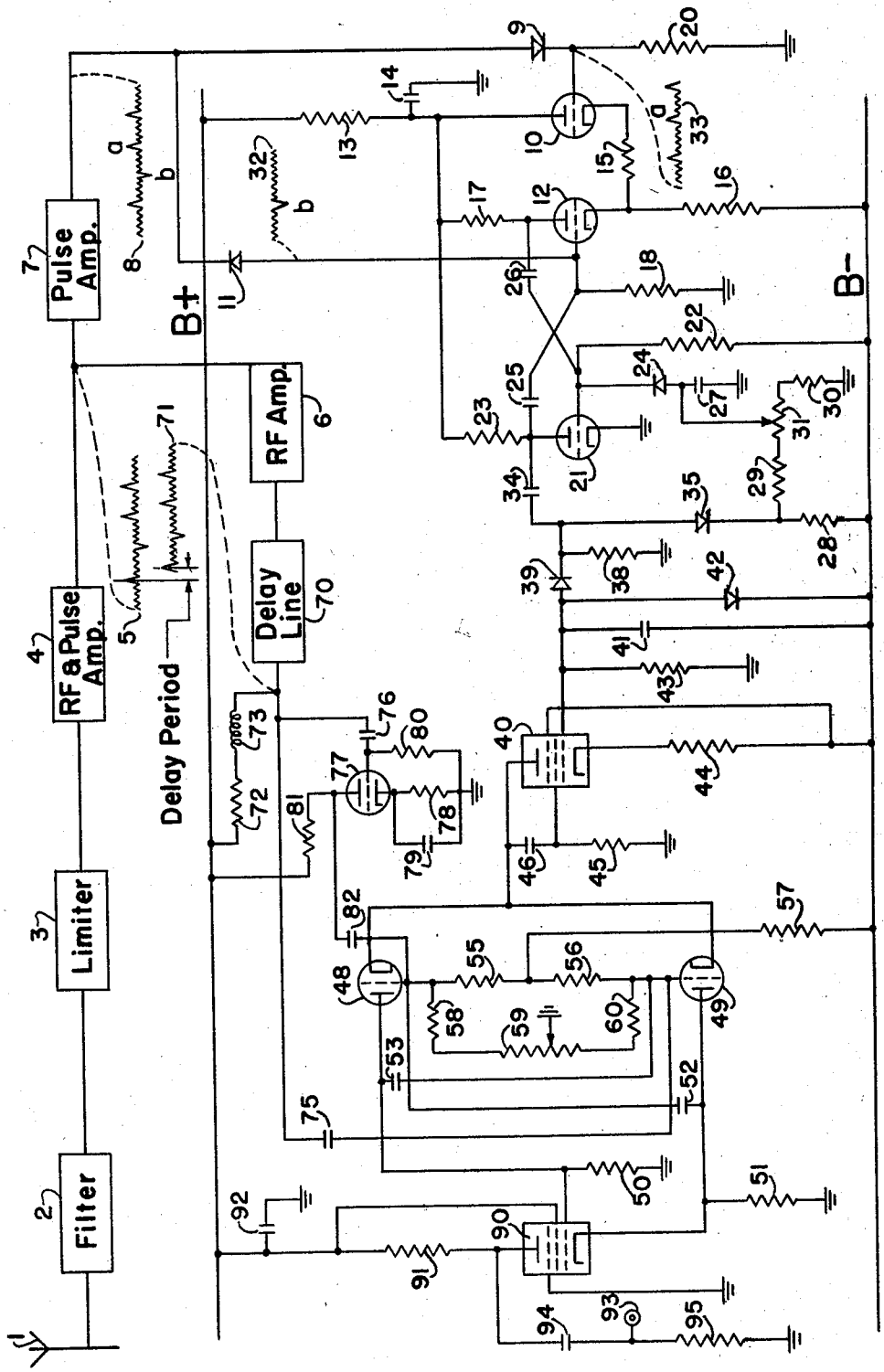

RADIO INTERFERENCE ELIMINATOR

Edgar W. Buebel, Jr., Owings Mills, Md., assignor to Hoover Electronics Company, Baltimore, Md., a corporation of Maryland Application June 27, 1957, Serial No. 668,526

12 Claims. (Cl. 250—20)

The present invention relates primarily to the art of radiant energy communication and is particularly designed to provide a reliable, efficient, economical and effective means for protecting communications receivers from the influence of unwanted electrical interference such as static, radar and other types of pulses or discharges which may be superimposed on a received intelligence bearing signal.

More particularly the invention is designed and intended to provide an effective means to eliminate static pulses of the so-called precipitation type static from the signal input to a communications receiver.

Considerable difficulty to the extent of complete unintelligibility is encountered in communications receivers, particularly for aircraft, due to unwanted pulses such as radar pulses and precipitation static pulses appearing in the antenna. The amplitude and wave front steepness of such pulses produce effects rendering the received signal unintelligible such as shock excitation or ringing in the tuned circuits of the receiver and overloading of the circuits.

It is accordingly a primary object of the present invention to provide a means by which unwanted electrical impulses will be detected and eliminated from the signal in an interference eliminator inserted between the antenna and the receiver, and such pulse removal will be accomplished without introducing other distorting influences into the intelligence signal or blanking an unacceptably large proportion thereof.

In accordance with my invention the complete signal appearing in the antenna of a communications receiver may first pass through a preliminary filter in which strong sinusoidal signals (AM broadcasts for example) appearing in the antenna signal may be eliminated or attenuated. The filtered signal, after suitable amplification, is fed in parallel circuits to a delay line and to a pulse detecting and slicing circuit. The delay line feeds in suitable manner to a push-pull gated amplifier which in turn drives a reverter to provide a signal to be applied to the communications receiver. The signal plus unwanted pulses is also applied to a blanking pulse forming and intelligence signal slicing circuit the pulsed output of which is utilized to blank the gated amplifier when unwanted pulses are applied thereto. The reverter functions to neutralize and eliminate cut-off transients which might appear in the output of this circuit.

The hereindisclosed invention has been found to perform the foregoing functions in a most effective and efficient manner. For example, it will virtually eliminate random discharge of the corona type averaging forty thousand pulses per second from an intelligence signal without perceptible distortion of the intelligence signal and without losing any intelligence of significance therefrom.

Other objects and advantages of the invention will become apparent as the description proceeds when taken in connection with the accompanying drawing which is a schematic representation of the essential circuity of my interference eliminator. Cathode heaters and their supply connections have been omitted for clarity.

Typical wave forms have been shown at a few points in the drawing connected by dashed lines to the circuit point at which such wave forms would be expected to appear.

Referring now to the drawing, I have illustrated an antenna 1 which feeds into a filter or attenuator 2. The filter 2 may be of any desired type designed to attenuate or eliminate strong sinusoidal signals appearing in the antenna signal. Suitable switching, not shown, may be provided to remove this element from the circuit as it is needed only when the receiver is in an area of high sinusoidal signal strength.

The output of the filter 2 is a composite signal of the intelligence signal having superimposed thereon random undesired pulses of various origins. This composite signal is then applied optionally to a suitable limiter 3 biased to clip those portions of the composite signal exceeding certain maximum positive and negative values. Such maximum signal strength limiting is desirable to protect following circuity from the ill effects of excessive signal amplitudes.

The output of the limiter 3 is fed to a conventional broad band amplifier 4. This element of the system may consist of one or more stages as may be desired in a particular instrument. A typical output of the amplifier 4 is indicated by the reference character 5 showing positive and negative going unwanted pulses or spikes. The signal 5 is applied in parallel to a broad band RF amplifier 6 and to a pulse amplifier 7. Each of these amplifiers may include any desired number of stages.

The output of the pulse amplifier 7, shown by the wave form diagram 8, is effectively the same as the wave form diagram 5. The amplifier 7 is connected in parallel through a crystal diode 9 to the grid of a polarizing triode 10 and through a reversely connected crystal diode 11 to the grid of the first stage 12 of a monostable multivibrator. The anode of the triode 10 is connected through a low value isolation resistor 13, of the order of one hundred ohms, to a positive voltage power supply line identified as B+. A small grounded condenser 14 is also connected to the anode of the triode 10 to remove RF transients which may appear. The cathode of the triode 10 is connected through a resistance 15 to the cathode of the triode 12 which in turn is connected through a resistance 16 to a negative voltage supply identified as B—.

The B+ and B— supply lines may be of the order of one hundred to one hundred and fifty volts above ground and one hundred to one hundred and fifty volts below ground, respectively.

The anode of the multivibrator triode 12 is connected through a resistance 17 and resistance 13 to the B+ line. The grid of the triode 12 is grounded through a resistance 18. The grid of triode 10 is returned to ground through a resistance 20 of a value approximately the same as that of resistance 18.

The values of resistances 16 and 17 are selected to maintain the triodes 10 and 12 conducting with their cathodes positive with respect to their grids.

The multivibrator is provided with a second, normally non-conducting, triode 21 having its anode connected to the B+ supply through a resistance 23 and resistance 13. The cathode of the triode 21 is directly connected to ground. The grid of triode 21 is connected through a leakage resistance 22 to the negative voltage supply B—. The resistance 22 has a relatively high value of the order of one megohm, for example.

A series connected group of resistances 28, 29, 30 and potentiometer 31 are connected between the B— supply and ground to provide a voltage divider. The grid of the triode 21 is clamped by the crystal diode 24 to a negative voltage determined by the setting of the slider on the potentiometer 31. The resistance values of the group of resistances 28, 29, 30 and potentiometer 31 are so chosen as to limit current flow therethrough to an insignificant value and to allow the slider to apply a normal bias to the grid of triode 21 somewhat below its cut-off value to maintain triode 21 normally non-conductive. The diode 24 is connected to prevent the grid voltage of triode 21 from dropping below the value determined by the setting of the slider on the potentiometer 31. This diode is also RF grounded through a capacitor 27.

Referring now to the output of the amplifier 7, the wave form includes positive pulses identified by the letter "a" and a negative pulse identified by the letter "b." The negative pulse will be blocked by the diode 9 and will not affect the operation of the polarizing triode 10.

The negative pulse "b" will be passed by the diode 11, as shown by waveform 32, and will momentarily drive the grid of triode 12 negative toward cut-off value. The resulting positive excursion of the plate voltage of triode 12 will be coupled through the capacitor 26 to the grid of triode 21 driving that triode into conduction. As triode 21 begins to conduct the resulting negative swing in its plate voltage is coupled by capacitor 25 to the grid of triode 12 to drive that triode to cutoff. When the triode 21 is saturated there will be no further negative excursion of its plate voltage and the capacitor 25 then discharges through resistance 18 raising the grid voltage of triode 12 to cut-off value whereupon triode 12 again conducts. The resulting negative swing in the plate voltage of triode 12 applies a negative pulse through capacitor 26 to the grid of triode 21 to cut off that triode and to restore the circuit to normal operation.

The multivibrator is preferably designed to produce an output negative pulse of about one microsecond duration hereinafter called the multivibrator pulse. The multivibrator pulse appears as a negative pulse in the plate voltage of triode 21 and represents the conducting time of triode 21 which is determined by the time required for condenser 25 to discharge through resistance 18 sufficiently to raise the bias of triode 12 to the cut-off value.

Positive excursions "a" of the wave form 8 are blocked by diode 11 and passed by the diode 9 to apply a positive pulse to the grid of triode 10 which increases the rate of conduction therethrough. Increased conduction through triode 10 increases the voltage drop through the resistor 16 which raises the cathode voltage of triode 12 thus decreasing conduction therethrough to induce a positive swing in the plate voltage of triode 12 which is then coupled through the capacitor 26 to the grid of triode 21 to drive triode 21 into conduction. The action of the multivibrator is then the same as that explained above when a positive excursion of the plate voltage of triode 12 is induced by a negative excursion of its grid.

The output of triode 12 contains the RF intelligence signal which is eliminated at the grid of triode 21. The negative bias normally applied to the grid of the triode 21 differs from the cut-off voltage of the triode by an amount greater than the maximum positive excursion which will be applied thereto by the RF intelligence portion of the signal. The magnitude of an undesired pulse which will actually trigger the multivibrator into operation is determined by the setting of the potentiometer 31. This can be adjusted by the operator to maximum signal intelligibility and sensitivity as desired under particular circumstances of interference.

A condenser 34 is connected between the anode of the triode 21 and the junction of resistors 28 and 29 through a crystal diode 35. Condenser 34 is also grounded through a high leakage resistance 38. The resistor 28 is relatively small compared to the other resistors in the voltage divider, of the order of only a few hundred ohms, hence, the potential across the capacitance 34 will approach the total voltage difference between the B+ and B— supply lines when triode 21 is cut off.

When the triode 21 is triggered into conduction, the resulting multivibrator pulse applied to condenser 34 drives the plate thereof connected to the diode 35 to a potential considerably below the B— potential. Under these conditions the diode 35 isolates the capacitance 34 from the resistance bank 28 to 31.

The negative multivibrator pulse is coupled through the capacitance 34 and a crystal diode 39 directly to the control grid of a pentode gate tube 40. The grid of the gate pentode 40 is normally maintained at a value approaching the negative voltage B— by means of the crystal diode 42 and the resistance 43 connected between the grid of pentode 40 and ground. A capacitance 41 is also connected between the control grid of the pentode 40 and the B— supply line. The cathode of the pentode 40 is connected to the B— supply through a resistance 44 which in combination with certain other elements to be described will normally maintain this cathode voltage positive with respect to the grid voltage by an amount less than the grid cathode cut-off potential so the pentode 40 is normally conductive. The screen grid of pentode 40 is grounded through a resistance 45 and the suppressor grid is connected to the B— supply.

When the control grid of the tube 40 is driven negative by the multivibrator pulse, the diode 42 isolates the control grid from the B— supply at this time, and the diode 39 isolates the control grid from the condenser 34 when the multivibrator restores to normal operation. Consequently, the condenser 41 charges to the voltage differential between the grid and the B— supply and then discharges through the resistance 43 to restore the pentode 40 to conduction.

The resistance 43 and capacitance 41 form a pulse stretching circuit and the values thereof are chosen to provide a time constant sufficient to cut off the pentode gate tube 40 for a period of the order of three to ten microseconds depending on the particular type of interference cut-off period desired in a particular instrument. This cut-off period is herein referred to as the blanking pulse period. The variation in the blanking pulse period depends in part on the nature of the antenna system with which the instrument is used as some antenna systems stretch static pulses and require the longer cut-off period.

A condenser 46 is connected between the screen grid and anode of the pentode gate 40. The anode of pentode 40 is also connected to the cathodes of a push-pull amplifier consisting, in the illustrated embodiment of the invention, in push-pull connected triodes 48 and 49. The anodes of the push-pull amplifiers 48—49 are grounded through resistances 50 and 51, respectively. Hence, the normal conducting circuit for the push-pull amplifier and gate tube 40 is conduction through gate tube 40, the cathodes of tubes 48 and 49 and resistances 50 and 51 to ground.

When the negative output pulse of the multivibrator cuts off the pentode 40, the screen grid of pentode 40 swings in a positive direction. The positive excursion of the screen grid circuit of pentode 40 is coupled through the capacitance 46 to the cathodes of the amplifier triodes to drive these cathodes in a positive direction and cut off the triodes 48 and 49.

Neutralizing capacitances 52 and 53 are connected from the anode of amplifier 49 to the grid of amplifier 48 and from the anode of amplifier 48 to the grid of amplifier 49, respectively. Grid bias is applied to the amplifiers 48 and 49 through a balancing resistance network comprising resistances 55 and 56 which are series connected between the grids of these two amplifiers and have their midpoint connected through a resistance 57 to the B—negative voltage supply. The grids of the amplifiers 48 and 49 are further connected by the series connected resistances 58 and 60 and potentiometer 59. The arm of the potentiometer 59 is grounded. Adjustment of the grounded arm of the potentiometer balances the two amplifiers to assure that they will operate in a fashion to introduce minimum distortion or undesired transients at the output.

As was noted above, the output of the RF and pulse amplifier 4 is fed not only to the noise channel pulse amplifier 7 but also to an RF amplifier 6 which may comprise one or more stages as desired.

The output of the RF amplifier 6 is fed through a delay line 70, which introduces a time delay of the order of one-fourth to one-half microsecond. The wave form 71 shown in the figure with a dotted connection to the output of the delay line 70 is identical with the wave form 5 positioned immediately thereabove but is shown with a time delay to illustrate the action of delay line 70 with reference to its input signal. The delay line 70 is in the plate circuit of the final stage of the RF amplifier 6. Plate current is supplied to amplifier 6 from the B+ line through the resistance 72, peaking coil 73 and delay line 70. The resistance 72 and coil 73 serve to terminate the delay line 70 properly.

The delayed RF signal including noise pulses is coupled through the capacitance 75 directly to the grid of the push-pull amplifier stage 49. The output of the delay line is also coupled through a capacitance 76 directly to the grid of an inverter triode 77.

The cathode of the inverter is grounded through a resistance 78 which is bypassed by a condenser 79. A resistance 80 is connected between the grid of triode 77 and ground. The plate of the triode 77 is connected through a resistance 81 to the B+ voltage supply line and is also coupled through capacitance 82 directly to the grid of triode amplifier 48.

The function of the inverter 77 is merely to introduce 180° inversion of the output of the delay line in order that the signal output may be fed in phase opposition to the grids of the push-pull amplifiers 48 and 49.

Any particular interference pulse or spike appearing in the composite input signal arrives at the control grids of the push-pull amplifier 48—49 in time delayed relationship to a cut-off period of the gate tube 40 which is determined by the blanking pulse induced by the interference pulse in the pulse or noise circuit. Consequently, the amplifier stages 48—49 are completely cut off by their high positive cathode voltage whenever noise pulses appear in their grid circuits and such pulses do not appear in the output of the amplifiers 48—49 and are effectively removed from the signal.

The composite output of the push-pull amplifier is combined in a final stage consisting of a reverter pentode 90. The plate of the amplifier 48 is D.C. coupled to the control grid of the pentode 90, and the plate of the amplifier 49 is D.C. coupled to the cathode of pentode 90. The anode of pentode 90 is connected to the positive voltage supply through resistance 91. This line is grounded through a capacitance 92 to eliminate stray RF which may appear. The suppressor grid of this stage is grounded and the screen grid is connected directly to the positive voltage supply line. The signal output of the push-pull amplifier is applied in phase opposition to the grid and cathode of the reverter 90 and appears in phase in its output.

Transients introduced into the output of the gated amplifiers by cut off thereof are applied to the grid and cathode of the reverter 90 in in-phase relation and are thus substantially neutralized or eliminated. The reverter output then contains only the intelligence signal having very short duration blank or constant voltage segments therein at the points where a noise pulse was superposed on the antenna signal.

The output of the reverter 90 is applied to an output connection 93 through a coupling capacitance 94 which is grounded through the output resistance 95.

The foregoing interference and noise pulse eliminating circuit is characterized by extremely wide frequency response; that is, from frequencies of the order of one hundred kilocycles per second to thirty megacycles per second.

In brief essence, the device comprises a push-pull signal amplifier to which the signal, unchanged in form but delayed in time, is applied in phase opposition. In addition, the received signal plus undesired pulses is also applied to a noise pulse channel which responds only to the higher amplitude pulses. The RF intelligence portion of the signal is sliced from the signal in the pulse channel. The output of the noise channel is a pulse of predetermined amplitude and duration which is utilized to cut off the push-pull gated amplifier. The push-pull gated amplifier is cut off by the noise channel slightly before a noise pulse arrives at its input and remains cut off for a period of time sufficient to insure that the pulse has disappeared from the input signal before the output stage is restored to conduction.

It is to be noted that the circuit is not adversely affected when two or more pulses occur in sequence with a time relation between the two less than the cut-off period of the push-pull amplifier produced by a single pulse. If such multiple pulses occur the second pulse simply acts to trigger the second stage of the multivibrator into conduction as a result of which the condenser 41, at this time not fully discharged, is again charged to the peak value and maintains the gate tube 40 cut off for its full cut-off period measured from the instant the second pulse initiated recharging of capacitance 41.

The pulses of the type with which the present invention is concerned are normally of very short duration and appear in the form of steep spikes. The herein disclosed blanking arrangement responds to the presence of a noise pulse and produces a triggering pulse of approximately one microsecond duration which excites a stretching circuit to produce a blanking pulse which may vary in particular cases from approximately three microseconds to ten microseconds depending on the character of the interference with which the instrument is most likely to be used. The intelligence signal is applied to the output stage in time delayed relation to the blanking pulse to assure that the output stage will be completely cut off prior to the time the combined signal and noise pulse arrives.

The noise pulses of the type of which the present invention is concerned may appear as either positive going or negative going excursions with reference to the midpoint of the normal intelligence signal band, the present invention responds equally and in like sense to blank such pulses from the output regardless of pulse polarity.

As illustrated and described herein the present invention is inserted between the receiver and the antenna, however, other arrangements are contemplated. For example, when used with a VHF or UHF receiver, the antenna signal may be heterodyned down to a frequency suited to the noise eliminator, the lower frequency signal processed by the noise eliminator and the eliminator output heterodyned back to the original frequency to be applied to the receiver.

While I have illustrated and described the invention in considerable detail, it is to be understood that various changes may be made in the arrangement, proportion and construction of parts without departing from the spirit of the invention or the scope of the appended claims.

I claim:

1. An interference eliminator for removing unwanted pulses from a desired signal comprising a signal channel and a pulse channel, said pulse channel including a trigger triode having a cathode, an anode and a grid, means for applying negative excursions of the combined signal to the trigger grid; means for applying positive excursions of the combined signal to the trigger cathode whereby the trigger anode output responds in the same sense to positive and negative portions of the combined signal, a pulsing triode having a cathode, an anode and a grid coupled to the anode of the trigger triode, means for applying a fixed negative bias to the pulsing triode grid sufficient to maintain the pulsing triode cut off when subjected to grid bias from the trigger output representing the desired signal and to respond to trigger output representing unwanted pulses to produce an output pulse, means coupled to the output of the pulsing triode for converting the output pulse to a pulse of predetermined magnitude and time duration, said signal channel including a delay network and an amplifier connected to respond to the output of the delay network and means for applying the output pulse of the pulse channel to the amplifier to cut off the amplifier for the duration of unwanted pulses appearing in the output of the delay line.

2. An interference blanker adapted to be inserted between an antenna circuit and a receiver for removing noise pulses from a desired signal comprising an antenna signal amplifying circuit connected to apply the antenna signal to a signal circuit and a pulse circuit, said signal circuit including a signal delay network connected to receive the antenna signal and an output stage controlled by the delayed antenna signal, said pulse channel including polarizing means for segregating positive and negative components of the antenna signal, a mono stable multivibrator having a normally conducting trigger tube including anode, cathode and control electrodes, connections from the polarizer for applying negative components of the antenna signal to the control electrode and positive components of the antenna signal to the cathode electrode whereby the anode voltage swings positively in response to positive or negative antenna signal excursions, said multivibrator including a pulse generator tube having anode, cathode and control electrodes, means for applying the trigger tube anode signal to the pulse generator control electrode, means for applying a fixed negative bias to the control electrode of the pulse generator sufficient to maintain the pulse generator cut off when subjected to maximum amplitude positive pulses from the trigger tube representing the desired signal and of a value such that pulses appearing in the anode voltage of the trigger tube representing noise pulses will trigger the pulse generator into conduction producing a negative excursion in the anode voltage thereof, and means responsive to such negative excursions in the pulse generator output for rendering the output stage non conducting when a noise pulse is applied thereto from the delay line.

3. In an interference eliminator for removing random noise pulses superposed on an intelligence signal in a received composite signal the combination of a normally conducting output stage, a delay line connected to delay the composite signal and to feed the delayed signal to the output stage, a flip-flop circuit having a normal state and a triggered state and a predetermined time restoration to the normal state after the initiation of each triggered state, means for applying the undelayed composite signal to the flip flop circuit as a triggering potential, means biasing the flip flop circuit to remain in the normal state unless triggered by a pulse having an amplitude exceeding the normal maximum amplitude of the intelligence signal, means responsive to the triggered state of the flip flop circuit for generating a blanking pulse having a time duration exceeding the restoration time period of the flip flop circuit and the delay period of the delay line, and means responsive to each blanking pulse for rendering the output stage non conductive for the duration of the blanking pulse.

4. An interference eliminator for processing a composite received signal to remove from an intelligence signal random noise pulses of varying polarity and high amplitude comprising a signal channel including a push-pull amplifier consisting of a pair of electron tubes each having a cathode, an anode and a control electrode, a signal delay line for introducing a time delay into the composite signal, means for applying the delayed composite signal output of the delay line to the control electrode of one of the amplifier tubes, means for inverting the output of the delay line and for applying the inverted delay line output to the control electrode of the other amplifier tube, a noise pulse channel, means for applying the undelayed composite signal to the noise pulse channel, means in the noise channel responsive to noise pulses of high amplitude for producing blanking pulses of predetermined magnitude and time duration in response to each noise pulse in the composite signal exceeding a predetermined amplitude, a gate tube having an anode, a cathode, a control electrode and a screen electrode, means for applying the blanking pulses to the control electrode of the gate tube to cut off the gate tube for the duration of the blanking pulse, the cathode of the gate tube being connected to a source of negative potential, the anode of the gate tube being connected to the cathodes of the amplifier tubes, a resistance connected between the screen electrode and a potential positive with respect to the gate tube cathode potential, a capacitance connected between the screen electrode and anode of the gate tube, and a reverter stage having a control electrode connected to the anode of one of the amplifier tubes and a cathode connected to the anode of the other of the amplifier tubes.

5. An interference eliminator for processing a composite received signal to remove random noise pulses superposed on an intelligence signal comprising a blanking stage including a pair of electron tubes connected in push-pull each having a cathode, an anode and a control electrode, a delay line receiving the composite signal and imposing a predeetrmined time delay thereon, means coupling the delay line output to the control electrode of one of said tubes, means for inverting the delay line output and for coupling the inverted composite signal to the control electrode of the other of said tubes, a pulsing tube having a cathode, an anode and a control electrode, means for generating a signal varying positively corresponding in instantaneous value to the instantaneous value of the composite signal regardless of the polarity thereof, means coupling such generated signal to the control electrode of the pulsing tube, means applying a fixed bias to the control electrode of the pulsing tube to bias said control electrode negatively to the cathode below the cut-off value by an amount sufficient to render the pulsing tube responsive only to positive values of the generated signal exceeding a predetermined minimum value, means responsive to conduction through said pulsing tube for generating a blanking pulse of predetermined amplitude and time duration, means responsive to conduction through said pulsing tube for restoring said pulsing tube to cut off in a time period less than the time duration of said blanking pulse, and means responsive to a blanking pulse for cutting off the tubes of said blanking stage for the duration of the blanking pulse.

6. Apparatus according to claim 5 wherein the anodes of the blanking tubes are connected respectively to the cathode and control electrode of a reverter tube having an anode from which the intelligence signal relieved of noise pulses is derived.

7. An interference eliminator for relieving a composite received signal of high amplitude noise pulses superpoesd on an intelligence signal comprising a blanking electron tube having a cathode, an anode and a control electrode, a delay line for feeding the composite signal to the control electrode of the blanking tube, a blanking pulse generator including a pulse forming tube having an anode, a cathode and a control electrode, means for reforming the undelayed composite signal into a varying amplitude signal varying positively above a fixed reference potential having instantaneous values proportional to instaneous values regardless of polarity of the composite signal, means coupling the reformed composite signal to the control electrode of the pulse forming tube, means for applying a negative bias potential to the control electrode of the pulse forming tube having a value negative relative to the cathode potential of said tube by an amount sufficient to maintain said tube cut off except when the control electrode thereof is subjected to a positive excursion of the reformed composite signal exceeding a predetermined minimum value, means responsive to current flow through the pulsing tube for returning the pulsing tube to cut off, means responsive to conduction through the pulsing tube for generating a blanking pulse of predetermined time duration and means responsive to a blanking pulse for cutting off the blanking tube for the duration of the blanking pulse to eliminate noise pulses in the blanking tube output.

8. An interference eliminator for processing a composite received signal having random noise pulses superposed on an intelligence signal to blank such noise pulses comprising a normally conducting intelligence signal output circuit from which the processed intelligence signal is derived, a signal delay line connected to receive the composite signal and to apply the delayed composite signal to the output stage, a blanking pulse generating circuit including a normally non conductive triode having a cathode, an anode and a control electrode, means for deriving a trigger signal from the undelayed composite signal having instantaneous potential positive with respect to a reference potential by an amount directly proportional to the instantaneous value of the composite signal regardless of polarity, means normally biasing the control electrode of said triode below the cut-off potential thereof by a potential exceeding the maximum positive excursion of said trigger signal attributable to the intelligence signal whereby said triode is triggered into conduction only in response to noise pulse components of the trigger signal, and means responsive to conducting period of said triode for rendering said output circuit non conducting for a predetermined time period exceeding the delay time of the delay line and the duration of the noise pulse inducing the conducting period of the triode.

9. Apparatus according to claim 8 wherein the output stage includes a pair of tubes connected in push-pull and each tube has a cathode, an anode and a control electrode, the delay line output is applied directly to the control electrode of one of said output tubes, and includes means for inverting the output of the delay line and for applying the so-inverted composite signal to the control electrode of the other output tube, and the anodes of the output tubes are connected respectively to the cathode and control electrode of a final tube having an anode from which the processed signal is derived.

10. Apparatus according to claim 8 wherein the means responsive to the triode conducting period comprises a diode coupled to the anode of the triode and connected to pass only negative excursions of the anode potential, a pulse stretching circuit comprising a capacitance and resistance series connected between a source of negative potential and ground with the capacitance connected to the negative potential, means connecting the junction point of the capacitance and resistance to the diode, a second diode connected to the said junction point and the source of negative potential in a manner to prevent the junction point potential from joining positive to the negative potential, and means responsive to negative excursions of the junction point for rendering the output circuit non conductive for the duration of such negative excursion.

11. An interference eliminator for blanking those portions of a received composite signal representing random high amplitude noise pulses superposed on an intelligence signal comprising a delay line connected to receive the composite signal and to impose a predetermined time delay thereon, a push-pull amplifier comprising a pair of tubes each having an anode, a cathode and a control electrode, means coupling the delay line output to the control electrode of one of said tubes, means for inverting the delay line output and for coupling the inverted delayed composite signal to the control electrode of the other of said tubes, means for deriving a final signal from the anodes of said tubes, a blanking tube including an anode, a cathode, a screen electrode and a control electrode, means connecting the cathode of the blanking tube to a negative potential, means connecting the anode of the blanking tube to the cathodes of the amplifier tubes, a capacitance coupling the screen electrode to the blanking tube anode, a load resistance connected to the screen electrode, and means responsive to the undelayed composite signal for generating a negative blanking pulse in response to each noise pulse in the composite signal exceeding a predetermined amplitude and for applying such blanking pulses to the control electrode of the blanking tube to cut off the blanking tube and amplifier tubes whenever a noise pulse is applied to the amplifier tubes.

12. In an interference eliminator having means for delaying a received composite signal having noise pulses superposed on an intelligence signal, an output circuit normally responsive to the delayed signal, characterized by the provision of a circuit receiving the undelayed composite signal including first and second parallel connected crystal diodes arranged to pass the negative and positive portions respectively of the composite signal, a normally conducting trigger triode having a cathode, an anode and a control electrode, means for applying the signal passed by the first diode to said control electrode, a normally conducting inverter triode having an anode, a cathode and a control electrode, a source of negative potential, a resistance connected between the source of negative potential and the cathode of the trigger triode, a resistance connecting the cathode of the inverter to the cathode of the trigger triode, means for applying the signal passed by the second diode to the inverter control electrode whereby the anode potential of the trigger triode responds in like sense to positive and negative excursions of the composite signal, and means responsive only to excursions of the trigger anode exceeding excursions induced by the intelligence signal for rendering the output circuit non conductive for a period beginning prior to the application of each noise pulse to the output circuit and extending beyond the termination of such noise pulse.

References Cited in the file of this patent

UNITED STATES PATENTS

| | | |
|---|---|---|
| 2,060,969 | Beers | Nov. 17, 1936 |
| 2,151,773 | Koch | Mar. 28, 1939 |
| 2,610,293 | Hanchett | Sept. 9, 1952 |